Dec. 28, 1948.                G. SLAYTER ET AL                 2,457,785
                        APPARATUS FOR MAKING GLASS FILM
                            Filed Aug. 18, 1944

INVENTOR.
Games Slayter
Henry Snow.
BY
Attorneys.

Patented Dec. 28, 1948

2,457,785

UNITED STATES PATENT OFFICE 2,457,785

APPARATUS FOR MAKING GLASS FILM

Games Slayter and Henry Snow, Newark, Ohio, assignors to Owens-Corning Fiberglas Corporation, Toledo, Ohio, a corporation of Delaware Application August 18, 1944, Serial No. 550,117

6 Claims. (Cl. 49—17)

This invention relates to an improved apparatus for manufacturing glass film.

There are numerous and diversified uses for glass film produced in accordance with this invention. However, for the purpose of this description, it will suffice to point out that the product resulting from the use of the apparatus claimed herein is not only capable of replacing mica in practically all of its numerous applications but, in addition, possesses the advantage that it may be fashioned in practically any size sheet, as distinguished from mica sheets which are necessarily formed of a multitude of relatively small flakes.

With the above in view, the present invention has as one of its objects apparatus for the manufacture of relatively wide thin sheets of glass on a production basis.

Heretofore it has been extremely difficult to produce glass in very thin sheets or flakes of any appreciable size. One prior attempt to obtain such glass was blowing a large glass bubble until it broke or fractured. This produced fragments of unusually small size, a great many of which were slightly wedge-shaped due to the conditions attendant the blowing of the bubble. More recent methods of producing foliated glass consisted in flowing or drawing glass in the form of a thin walled tube or cylinder which is afterward broken into small pieces. In a previous attempt to produce a thin sheet of glass within the range of .0001 to .0005 inch in thickness a continuous strip or ribbon was attenuated by means, such as rolls, from a flat stream of molten glass. It was found that as the stream issued from the feeder or bushing it had a tendency to neck in to approximately two-thirds of its former width and as it was attenuated at high speed a substantial bead formed along each edge. This, of course, proved undesirable, and was due mainly to the effect of surface tension on the glass of the extreme thinness of the attenuated ribbon.

It is another object of the invention to form sheets of thin glass without marginal beads by flowing molten glass in the form of a tubular stream and attenuating it to a film-like thickness.

It is another object of the invention to form a thin walled tube of glass which may be attenuated and flattened into a ribbon of uniform thickness and of any desired practical width and length within commercial limits.

In attempting to flatten tubes formed in the above manner to obtain flat sheets or ribbons therefrom, the walls at the point of folding or creasing become hardened or set before they can be brought entirely together and thus form a hollow edge which has a tendency to shatter as the ribbon is engaged by the attenuating rolls. While this normally reduces the available flat width of the sheet, we have found that in the practice of our improved method of operation this objectionable feature is reduced in scope to an ineffectual limitation.

It sometimes occurs in flattening a tube of the above character by means of rolls or other attenuating means that wrinkles are formed in the plane surface. This results in an undesirable condition by producing a wall having an uneven surface and varying thickness, and it is a further object of the invention to form a ribbon of glass having plane surfaces which are free of wrinkles and other imperfections.

We have found that a substantially wider sheet may be successfully formed from a tubular stream of a given diameter by permitting the glass while still plastic to expand normally under the influence of pressure from within.

It is another object of the invention to form a thin walled tube of glass which can be expanded by pressure from within and flattened to a thin sheet.

The fragile nature of glass film both while plastic and when cooled requires certain care in producing and handling to prevent its destruction. Slight changes in temperature and viscosity of the glass and vibrations are transmitted to the cooled film and when severe interrupt the production operation by breaking the film. The glass is maintained in the bushing at a relatively high temperature, so that the viscosity is correspondingly low and is flowed in a tubular stream from the bushing under the influence of gravity. The tubular stream is caught between the rapidly rotating attenuating rolls which squeeze the tube together and seal the interior from the atmosphere. Fluid under pressure is fed into the tube at such a rate that the tube is expanded to a diameter substantially larger than the orifice from which it issues. Thus the tube is expanded laterally as well as being attenuated lengthwise so that without increase in pulling speed a film of greatly reduced thickness will be formed.

The expanded tube assumes the form of a bubble the size of which is dependent upon the pressure within the tube and the surface tension of the plastic glass. The body of air or other gas, such as oxygen or nitrogen, forming the bubble yields with sudden changes in temperature and/or thickness of the glass, to cushion cooled portions of the film against being unduly stressed to the breaking point. These sudden changes, etc. are usually only momentary so that production of the film is uninterrupted. It is a still further object of the invention to provide a cushion for absorbing stresses created in the glass while forming a tubular film therefrom.

Another important advantage in forming double thickness sheets of film lies in the fact that cracks or fractures to one of the films do not propagate across the adjacent film and thus do not destroy the resistance of the film to penetration by moisture.

Other objects and features of novelty will be in part apparent and in part pointed out during the course of the following description when considered in view of the accompanying drawings, in which.

This application is a continuation-in-part of our copending application Serial No. 504,786, filed October 2, 1943, which issued as Patent No. 2,386,511, October 9, 1945.

Figure 1:
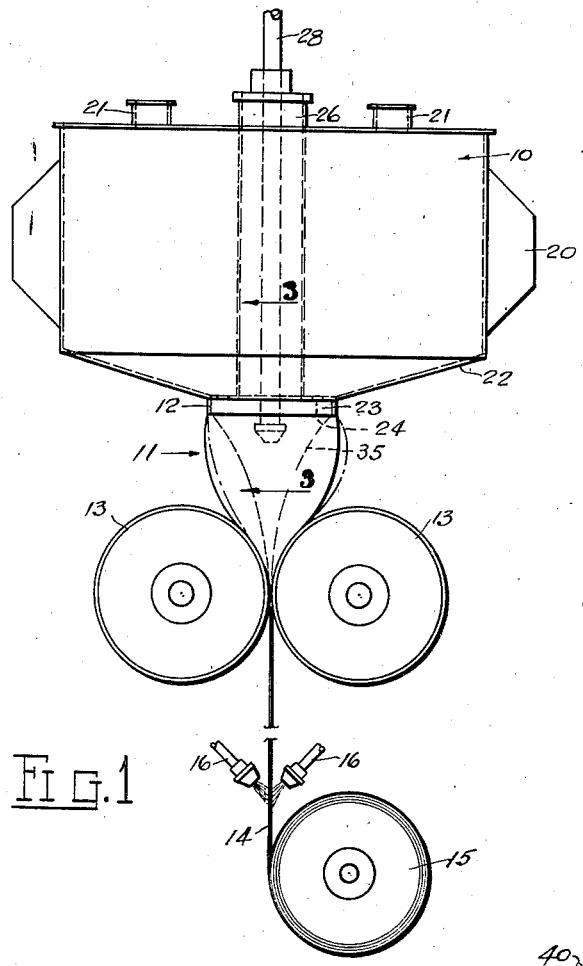
Figure 1 is a diagrammatic elevational view of an apparatus suitable for the practice of the present invention.

In general, the apparatus for forming glass film as shown in Figure 1, includes a glass melter or bushing 10 into which glass forming materials are placed and melted to produce a molten hollow stream 11 which issues from an orifice 12 in the bottom of the bushing. The stream is engaged between a pair of oppositely rotating rolls 13 driven at a relatively high speed by mechanism not shown and attenuated and flattened thereby to produce a thin flat ribbon or sheet of film 14. The formed sheet is then wound on a suitable packaging spool 15 or cut into sheets for storage or for use in later manufacturing processes as will be brought out presently. If desired, a lubricant may be applied to the surface of the film by means of sprays 16 for ease of handling and protection against abrasion.

More specifically, the bushing 10 comprises a metallic walled container which may be of substantially rectangular shape having terminal lugs 20 welded to each end to which a suitable source of electric current is connected to supply melting heat to the bushing. Glass batch materials, which may be in any suitable form, are placed in the bushing through charging openings 21 arranged in the bushing lid. The bottom wall 22 of the bushing is formed to provide the discharge orifice designated at 12 in Figures 1 and 2.

Figure 3:
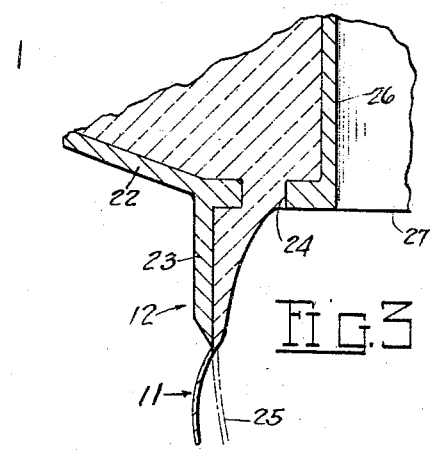
Figure 3 is a detail sectional view taken on the line 3—3 of Figure 1.

The orifice 12 includes an annular depending ring or flange 23 formed on the wall and enclosing a row of closely arranged openings 24 in the bottom wall 22 and spaced slightly from the ring as shown in detail in Figure 3. The molten glass flows through the openings 24 and onto the inner surface of the ring 23 from which it flows normally in the form of a straight walled tube as indicated by broken lines 25 in Figure 3. Flowing the glass over the inner surface of the ring 23 assures that the streams from the openings 24 will recombine into a thin uniform film to provide uniformity of the tube. Also, escape of seedforming gases from the glass is facilitated by having one side of the film exposed to the atmosphere.

The portion of the bottom wall in which the openings 24 are formed is relatively narrow in width and its inner edge is defined by an annular upwardly extending wall 26 which forms a vertical tubular opening 27 or passage extending through the bushing and axially aligned with the ring and row of orifices. The passage provides an opening for the introduction of pressure into the tube by means of a pipe 28 having a suitable sealing connection 29 with the top of the opening. This provides a chamber which is closed to the atmosphere when the glass tube 11 is flattened by the rolls 13. The bushing 10 may be insulated against heat losses by a refractory material which encloses all but the flange 23 as indicated by the broken lines 30 in Figure 2. This exposes the outside of the flange to the atmosphere to radiate heat from the flange and thus aid in cooling the glass as it flows from the bushing. The molten glass in the bushing is maintained at a high temperature and is relatively fluid so that it flows readily onto the flange. This temperature is normally several hundred degrees higher than the attenuating temperature this necessitating a rapid reduction of heat as the glass passes over the flange to preserve the intergrity of the tube.

It may at times be desirable to introduce a lubricant into the glass tube so that the walls when flattened may readily be separated. This may be accomplished by connecting a source of lubricating material to the pressure line 28 to which suitable cooling means or insulating material has been added. The lubricant may be either vegetable or castor oil or a light mineral oil.

When the bushing has been brought to operating temperature the molten glass flows through the openings 24 and onto the ring 23 from which it flows in the form of a hollow tube. The glass which is relatively fluid may assume, under the influence of surface tension, the symmetrical shape indicated by the dash line 35 in Figure 1. This is effected by the rapid cooling of the outer surface of the stream after it leaves the ring. The rolls 13 are moved apart until the stream is flowing smoothly after which they are brought together while rotating and seize the stream. This action draws the stream downwardly and reduces the tendency of the stream to "neck in," the walls thereof being drawn into a line substantially tangential with the roll surface when viewed as in Figure 1. It has been observed that as the tube is drawn and flattened it will eventually acquire substantially the dimensions of the orifice and flatten accordingly as it is squeezed by the rolls. However, with continued attenuation the tube may tend to draw from the inside of the lower edge of the ring. Then, as the tube cools upon exposure to the atmosphere and the outer surface is prevented from stretching, the hotter glass forming the inner surface is not placed under tension and flows readily with the moving film in greater volume than is desired.

In addition, electrically heated melters of the present type at times are subject to heat changes due possibly to variations in current supply which cause hot or cold spots in the glass or batch material being used. Sometimes air currents or drafts are the cause of transient temperature variations which usually are not of long duration but are transmitted immediately to the film with destructive effect. As the tube is attenuated tension is created substantially uniformly around the circumference and in this condition any shocks from sudden temperature changes such as from drafts causing a localized chilling or from sudden mechanical vibrations causes the cold friable film to shatter and thus interrupt the operation so that complete restarting is made necessary.

Figure 2:
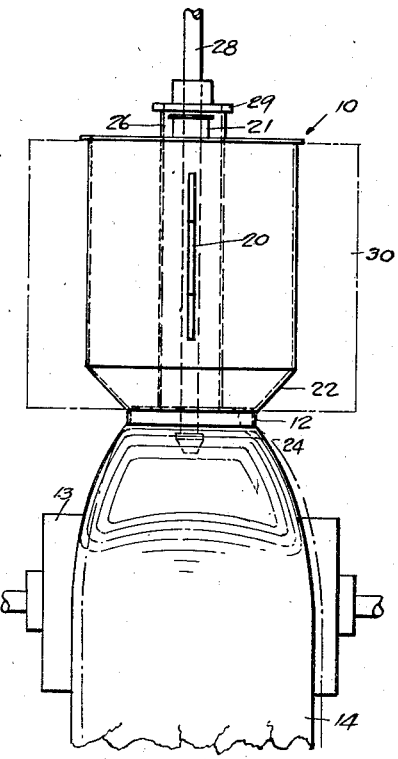
Figure 2 is a similar view taken at right angles to the showing of Figure 1.

We have overcome this limitation by introducing fluid pressure into the tube as it is being formed and attenuated. Only a small amount of air or oxygen at low pressure, that is, slightly above atmospheric pressure, is required to expand the tube while it is plastic to substantially the shape shown at 11 in Figure 1. As the gas entering the tube becomes heated it expands to produce a "bubble" between the rolls 13 and the forming ring 23. This enables a wider sheet of film to be drawn as indicated in Figure 2. The formation of the bubble provides for a more even distribution of glass in the wall of the tube as well as forming a cushion which supports the film as it is attenuated.

The body of gas within the tube is yieldable and absorbs shocks which would otherwise cause the tube to shatter. Slight changes in temperature of the glass in the bushing also have little or no effect on the formation of the film since the surface of the bubble is sufficiently deformable to absorb the variations resulting from temperature and viscosity changes.

The tube when expanded by the gas to form a bubble of larger diameter than the ring from which it is drawn causes the glass to be attenuated at an angle from the ring as shown in Figure 3. This results in pulling the glass sharply over the knife-like edge of the ring to increase the tension on the glass, particularly on the hot inner surfaces. This serves to retard the flow of the hotter inner glass and thus provide a substantially uniform wall thickness of attenuated glass.

The walls of the flattened tube are extremely smooth surfaced, particularly the inner surface which is also devoid of atmospheric moisture. It has been found that the walls of the tube adhere firmly together due to the tendency of newly formed smooth glass surfaces which are free of atmospheric moisture to seize each other. This characteristic is beneficial in handling the film in continuous lengths since each side serves to reinforce the other, particularly when laminates are to be made therefrom.

Figure 4:
Figure 4 is a sectional view on an enlarged scale through a laminate formed from glass film made in accordance with the present invention.

Figure 4 illustrates on a greatly enlarged scale a laminate made from a plurality of sheets 40 of the double thickness film coated with an adhesive material 41 which may be either a thermoplastic or a thermosetting resin or a varnish having electrical insulating properties. One suitable varnish adaptable to the present application is polyisobutylene, known commercially as Vistanex. Laminates may also be produced by laminating together sheets of glass film with sheets of cellulose film, rubber hydrochloride, or other plastic materials in sheet form.

High dielectric properties are obtained by using glass film in continuous sheet form in which the unbroken surfaces of the film provide an impervious sheet. This is a great advantage where resistance to moisture penetration is required and it is not readily obtainable when film in the form of small flakes are used.

It is also to be understood that the thin film formed in the present manner may be reduced to flakes of any desired size by cutting, chopping or ball milling when it is desired to use them as a reinforcement for plastics. The dielectric qualities of the glass flakes are advantageous in electrical applications and when combined with a suitable resin having the requisite characteristics such as, for instance, melamine, an efficient electrical insulation is obtained.

We claim:

1. In an apparatus for forming a thin walled glass tube adapted to be attenuated and flattened to a thin wide ribbon, a bushing for melting and flowing glass, a substantially annular flange depending from said bushing, openings in the bottom of the bushing and along the inner surface of said annular flange to flow glass over the inner surface of said flange in the form of a continuous tube, means for introducing fluid pressure into the tube to expand it while still plastic into a bubble of larger diameter than said flange having a substantially uniform wall thickness, and attenuating means spaced from said depending flange and adapted to flatten the tube and seal the interior thereof from the atmosphere.

2. In an apparatus for forming a thin walled glass tube adapted to be attenuated and flattened to a thin wide ribbon, a bushing for melting and flowing glass, a depending annular flange having one side exposed to the atmosphere formed on the bottom wall of said bushing and defining a discharge orifice including a plurality of closely spaced openings in said bottom wall adjacent the upper end of said flange opposite from said exposed side, the glass from said bushing flowing through said openings onto said flange and forming a continuous thin walled tube as it discharges therefrom, and means for introducing fluid under pressure into the tube to expand the tube outwardly from the rim of said flange.

3. Apparatus for forming glass film comprising a container for molten glass, an annular flange depending from the bottom wall of said container, means for flowing the glass from said container and over the inner surface of said flange and from the lower edge of the flange as a thin-walled hollow stream, means spaced from said flange in the direction of stream flow adapted to flatten the stream and seal the interior thereof from the atmosphere, and means for introducing air into the hollow stream that is between said flange and said means to flatten the stream to thereby form a bubble in the stream adjacent the lower end of the flange.

4. Apparatus for forming glass film comprising a container for molten glass, an annular flange depending from the bottom wall of said container, means for flowing the glass from said container and over the inner surface of said flange and from the lower edge of the flange as a thin-walled hollow stream, means spaced from said flange in the direction of stream flow and including coacting surfaces for engaging said stream between them to flatten the stream and seal the interior thereof from the atmosphere, said surfaces being movable in the general direction of stream flow to attenuate the stream, and means for introducing air into the hollow stream that is between said flange and said coacting surfaces to thereby form a bubble in the stream adjacent the lower end of the flange.

5. Apparatus for forming glass film comprising a container for molten glass, an annular flange depending from the bottom wall of said container, a series of openings through said bottom wall and located adjacent the inside wall of said flange for flowing the glass from said container and over the inner surface of said flange so that it flows from the lower edge of the flange as a thin-walled hollow stream, a pair of coacting rolls spaced from said flange in the direction of stream flow with the rolls of the pair so related as to flatten the stream between them and seal the interior thereof from the atmosphere, and means for introducing air into the hollow stream that is between said flange and said means to flatten the stream to thereby form a bubble in the stream adjacent the lower end of the flange.

6. Apparatus for forming glass film comprising a container for molten glass, an annular flange depending from the bottom wall of said container, a series of openings in the bottom wall and located inside of the annular flange and adjacent its inner surface for flowing the glass from said container and over the inner surface of said flange so that it flows from the lower edge of the flange as a thin-walled hollow stream, a pair of coacting attenuating rolls spaced from said flange in the direction of stream flow with the rolls of the pair so related as to flatten the stream between them and seal the interior thereof from the atmosphere, means for introducing air into the hollow stream that is between said flange and said means to flatten the stream to thereby form a bubble in the stream adjacent the lower end of the flange as the stream is attenuated, and a packaging roll at the out-feeding side of the attenuating rolls to wind up the attenuated and flattened stream.

GAMES SLAYTER.
HENRY SNOW.

REFERENCES CITED

The following references are of record in the file of this patent:

UNITED STATES PATENTS

| Number | Name | Date |
|---|---|---|
| 1,136,362 | Pease | Apr. 20, 1915 |
| 1,239,024 | Manning | Sept. 4, 1917 |
| 1,592,299 | Howard | July 13, 1926 |
| 1,750,972 | Soubier | Mar. 18, 1930 |
| 2,172,899 | Barnard | Sept. 12, 1939 |
| 2,243,194 | Cook | May 27, 1941 |
| 2,342,891 | Powers | Feb. 29, 1944 |

FOREIGN PATENTS

| Number | Country | Date |
|---|---|---|
| 483,843 | Germany | Oct. 5, 1929 |